(12) United States Patent
Bagade et al.

(10) Patent No.: US 11,509,536 B2
(45) Date of Patent: Nov. 22, 2022

(54) RELAY FUNCTIONALITY IN AN APPLICATION CENTRIC INFRASTRUCTURE (ACI) FABRIC

(71) Applicant: Cisco Technology, Inc., San Jose, CA (US)

(72) Inventors: Vedashree Bagade, Sunnyvale, CA (US); Ajay Kumar Modi, San Jose, CA (US); Umamaheswararao Karyampudi, Fremont, CA (US); Abhishek Gupta, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 72 days.

(21) Appl. No.: 17/075,084

(22) Filed: Oct. 20, 2020

(65) Prior Publication Data

US 2022/0123997 A1     Apr. 21, 2022

(51) Int. Cl.
*H04L 41/12*      (2022.01)
*H04L 49/25*      (2022.01)

(52) U.S. Cl.
CPC ............. *H04L 41/12* (2013.01); *H04L 49/25* (2013.01)

(58) Field of Classification Search
CPC ................................ H04L 41/12; H04L 49/25
See application file for complete search history.

(56) References Cited

U.S. PATENT DOCUMENTS

| 2016/0036762 A1* | 2/2016 | Droms | H04L 41/12 709/224 |
| 2018/0262463 A1* | 9/2018 | Peeters | H04L 12/2885 |
| 2020/0044917 A1* | 2/2020 | Peng | H04L 41/0803 |

* cited by examiner

*Primary Examiner* — Jamal Javaid
*Assistant Examiner* — Shawn D Miller
(74) *Attorney, Agent, or Firm* — Merchant & Gould P.C.

(57) ABSTRACT

Relay functionality may be provided. A network device may receive a response packet and may determine that one of Option-82 and Option-18 information is not present in the received response packet. Next, in response to determining that one of Option-82 and Option-18 information is not present in the received response packet, a database may be queried for information associated with the response packet. Then, based on the information associated with the response packet, the response packet may be sent to a client device associated with the response packet.

20 Claims, 3 Drawing Sheets

RELAY FUNCTIONALITY IN AN APPLICATION CENTRIC INFRASTRUCTURE (ACI) FABRIC

TECHNICAL FIELD

The present disclosure relates to relay functionality, and in particular, to relay functionality in an Application Centric Infrastructure (ACI) fabric.

BACKGROUND

A computer network or data network is a telecommunications network that allows computers to exchange data. In computer networks, networked computing devices exchange data with each other using a data link. The connections between nodes are established using either cable media or wireless media. The best-known computer network is the Internet.

Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other. Computer networks differ in the transmission medium used to carry their signals, the communications protocols to organize network traffic, the network's size, topology, and organizational intent.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
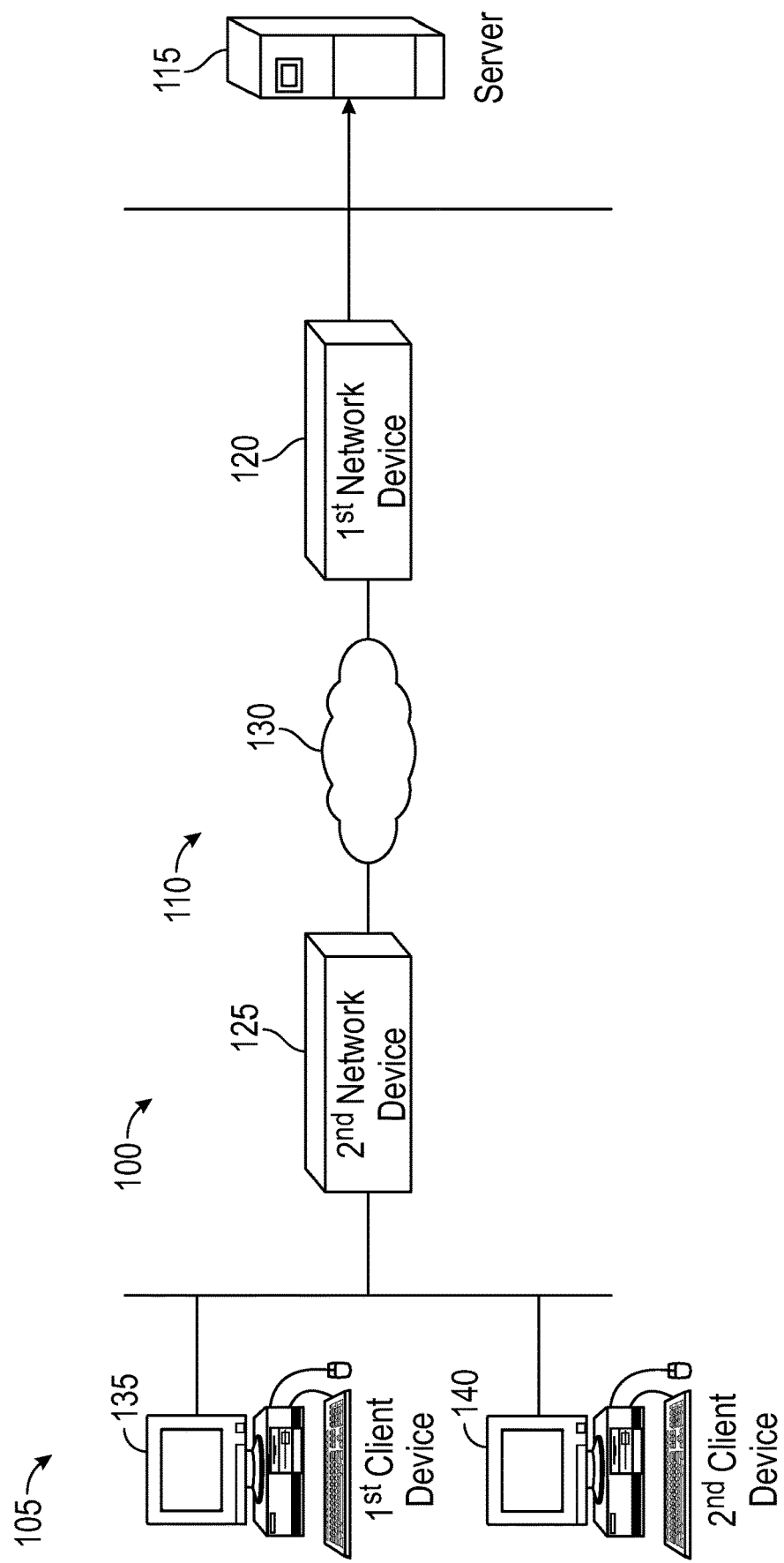
FIG. 1 is a block diagram of a network.

Relay functionality may be provided. A network device may receive a response packet and may determine that one of Option-82 and Option-18 information is not present in the received response packet. Next, in response to determining that one of Option-82 and Option-18 information is not present in the received response packet, a database may be queried for information associated with the response packet. Then, based on the information associated with the response packet, the response packet may be sent to a client device associated with the response packet.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A fabric network may comprise a network topology in which components pass data to each other through interconnecting network nodes (e.g., devices). Fabric networks comprise overlay and underlay. The underlay deals with connectivity between fabric network devices and the overlay deals with user traffic transiting the fabric network. The fabric network overlay may comprise functional components such as Fabric Edge (FE) devices, fabric intermediate devices, Fabric Border (FB) devices, and a map resolver/server.

In the fabric network overlay, FE devices may comprise, for example, Locator/ID Separation Protocol (LISP) xTR (Ingress/Egress Tunnel Router)/PxTR (Proxy xTR) nodes and FB devices may comprise, for example, LISP PxTR (Proxy xTR) nodes. End points (e.g., client devices or hosts) may be attached to the FE devices. The end points may be in Endpoint Identification (EID) space where each endpoint may have an EID. Each device in the fabric network (e.g., FE devices and FB devices) may be configured with an address (e.g., a locator address). FE devices may register discovered EIDs (from the end points) with a fabric host-tracking database running on the map resolver/server associating the discovered EID to, for example, the configured locator address of the FE device that discovered it.

When a local FE device receives a packet from a local end point destined to a remote end point (i.e., on a remote FE device) whose location is not known, the local FE device may send a map request message to the map resolver/server. Once the local FE device receives a reply message back from the map resolver/server associating the unknown EID to the remote locator address, all subsequent traffic from the local end point may be encapsulated (e.g., LISP encapsulated) and forwarded to the remote locator address (i.e., remote FE device). Once the encapsulated packet is received on the remote FE device, the remote FE device may decapsulate the packet and forward natively (e.g., to the remote endpoint).

FB devices may connect the fabric network to the native routing domain. FB devices may be configured, for example, as LISP PxTR nodes and may provide a default gateway service to the FE nodes. Communication may happen through the FB device configured, for example, as a LISP PxTR node. When an FE device receives a packet from a local end point destined to a host outside the fabric network in the native routing domain, the FE device may encapsulate and send the packet to the FB device. The FB device may provide, for example, the LISP PxTR functionality and advertise itself as a next-hop address for all the fabric managed EID prefixes to the native routing domain so that it can steer the traffic.

Fabric overlay may provide the following services. For example, fabric overlay may provide stretched Layer-2 service using Layer-3 overlay, which may provide the flexibility of extending a subnet to any part of the fabric network. For example, a subnet may be present across multiple FE devices with the same anycast gateway Internet Protocol (IP) address to allow for roaming by allowing endpoints to continue using the same gateway IP address. The provided services may also include Layer-3 overlay service and built-in mobility.

Dynamic Host Configuration Protocol (DHCP) may comprise a client/server protocol that may automatically provide an Internet Protocol (IP) host with its IP address and other related configuration information such as a subnet mask and a default gateway so that it may communicate with other IP networks. DHCP Option-82 (i.e., DHCP relay agent) may provide additional security when DHCP is used to allocate network addresses. It may enable the controller to act as a DHCP relay agent to prevent DHCP client requests from untrusted sources. DHCP Option-18 may provide, in DHCP version 6 (DHCPv6), the same functionality as DHCP Option-82 does for DHCP IPv4. DHCPv6 may comprise a network protocol for configuring Internet Protocol version 6 (IPv6) hosts with IP addresses, IP prefixes, and other configuration data required to operate in an IPv6 network. DHCPv6 may comprise the IPv6 equivalent of the DHCP IPv4.

Software-defined networking (SDN) (e.g., Application Centric Infrastructure (ACI)) may use DHCP Option-82 (or Option-18 with DHCPv6). This may help in adding additional information about a client's point of attachment in a DHCP request. Consequently, a DHCP server may append this info back in its response to have the response forwarded via the fabric to the client. Because of pervasive Switched Virtual Interface (SVI) support in an ACI fabric, the DHCP response may land on any of the Top-of-Rack (ToR) switches in the network. Accordingly, DHCP servers connecting to the ACI fabric may support Option-82. Similarly DHCPv6 servers may support Option-18. However, some DHCP servers may not support Option-82 (or Option-18) processing, which may result in packets not being forwarded to an originating client ToR. Embodiments of the disclosure may resolve this problem by removing the Option-82 (or Option-18 for DHCPv6) dependency from an ACI fabric.

While ACI fabric-wide flooding may be disabled by default, flooding within a Bridge Domain (BD) may be enabled by default. Because flooding within a bridge domain may be enabled by default, client devices may connect to DHCP servers within the same Endpoint Group (EPG). However, when the DHCP server is in a different EPG, BD, or context (Virtual Routing and Forwarding (VRF)) than the client devices, DHCP relay may be required. Also, when Layer-2 flooding is disabled, DHCP relay may be required.

Conventional ACI distributed fabric may support a pervasive gateway that may span across multiple leafs with the same gateway IP. Accordingly, with DHCP relay agent, the response packet from a DHCP server destined to pervasive gateway IP may land on any ToR switch. This response packet may need to be forwarded back to the original ToR that relayed the packet (i.e., the client device connected ToR). Conventional ACI fabric may use Option-82 (or Option-18 for DHCPv6) to store the original ToR information that relayed the packet. The DHCP server may have to preserve this information and may send it back in a response. The receiving ToR of this response packet may parse this Option-82 (Option-18 for DHCPv6) and may relay the packet back to original client device connected ToR. A supervisor on the client connected ToR may then strip Option-82 (Option-18 for DHCPv6) and direct the response to the client device that sent the request.

The conventional approach may enforce that the DHCP server support Option-82. If the DHCP server does not support Option-82 (or Option-18 for DHCPv6), the conventional approach may not work and packets may not be forwarded back to the requesting client device. These additional options may be added to DHCP packets for security reasons to avoid attacks like spoofing of IP and MAC, but some servers may not be configured to handle it and may require special handling from ACI, which may be provided by embodiments of the disclosure.

FIG. 1 shows a system 100 consistent with embodiments of the disclosure for providing relay functionality. As shown in FIG. 1, system 100 may comprise a plurality of client devices 105, a network 110, and a server 115. Network 110 may comprise a plurality of network devices including, but not limited to, a first network device 120, a second network device 125, and intermediate network devices 130 (illustrated as a cloud in FIG. 1). System 100 may comprise a fabric network implemented by SDN for example. Plurality of client devices 105 may comprise a first client device 135 and a second client device 140. Server 115 may comprise a Dynamic Host Configuration Protocol (DHCP) server for example.

The plurality of network devices in network 110 may comprise, but are not limited to, switches (e.g., ACI leaf switches) and routers for example. Network 110 may comprise any number of network devices. Plurality of client devices 105 may comprise any number of client devices and is not limited to two. Each of plurality of client devices 105 may comprise any type device wishing to communicate over network 110. For example, each of plurality of client devices 105 may comprise, but are not limited to, a Wi-Fi access point, a cellular base station, a tablet device, an Internet-of-Things (IoT) device, a mobile device, a smart phone, a telephone, a remote control device, a set-top box, a digital video recorder, a cable modem, a personal computer, a notebook computer, a network computer, a mainframe, a router, or other similar microcomputer-based device.

Network 110 may comprise a fabric network. The fabric network may comprise an underlay and an overlay. The underlay may deal with connectivity between fabric elements (e.g., network devices) and the overlay may deal with user traffic entering the fabric. Traffic may enter the fabric network (i.e., network 110) through FE devices (e.g., first network device 120 and second network device 125). The traffic may be routed through network 110 via a plurality of intermediate network devices within the plurality of network devices. The FE devices may be responsible for encapsulating a packet with a fabric header that contains an egress FE device address. When a packet (e.g., frame) arrives at the egress FE device, a fabric header may be stripped off and the native packet may be forwarded according to an inner address. The fabric network may be capable of providing Layer-2 and Layer-3 services on top of the underlay. The fabric network may have endpoints (e.g., plurality of client devices 105) connected to it.

The elements described above of system 100 (e.g., server 115, first network device 120, second network device 125, first client device 135, and second client device 140) may be practiced in hardware and/or in software (including firmware, resident software, micro-code, etc.) or in any other circuits or systems. The elements of system 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of system 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of system 100 may be practiced in a computing device 300.

Figure 2:
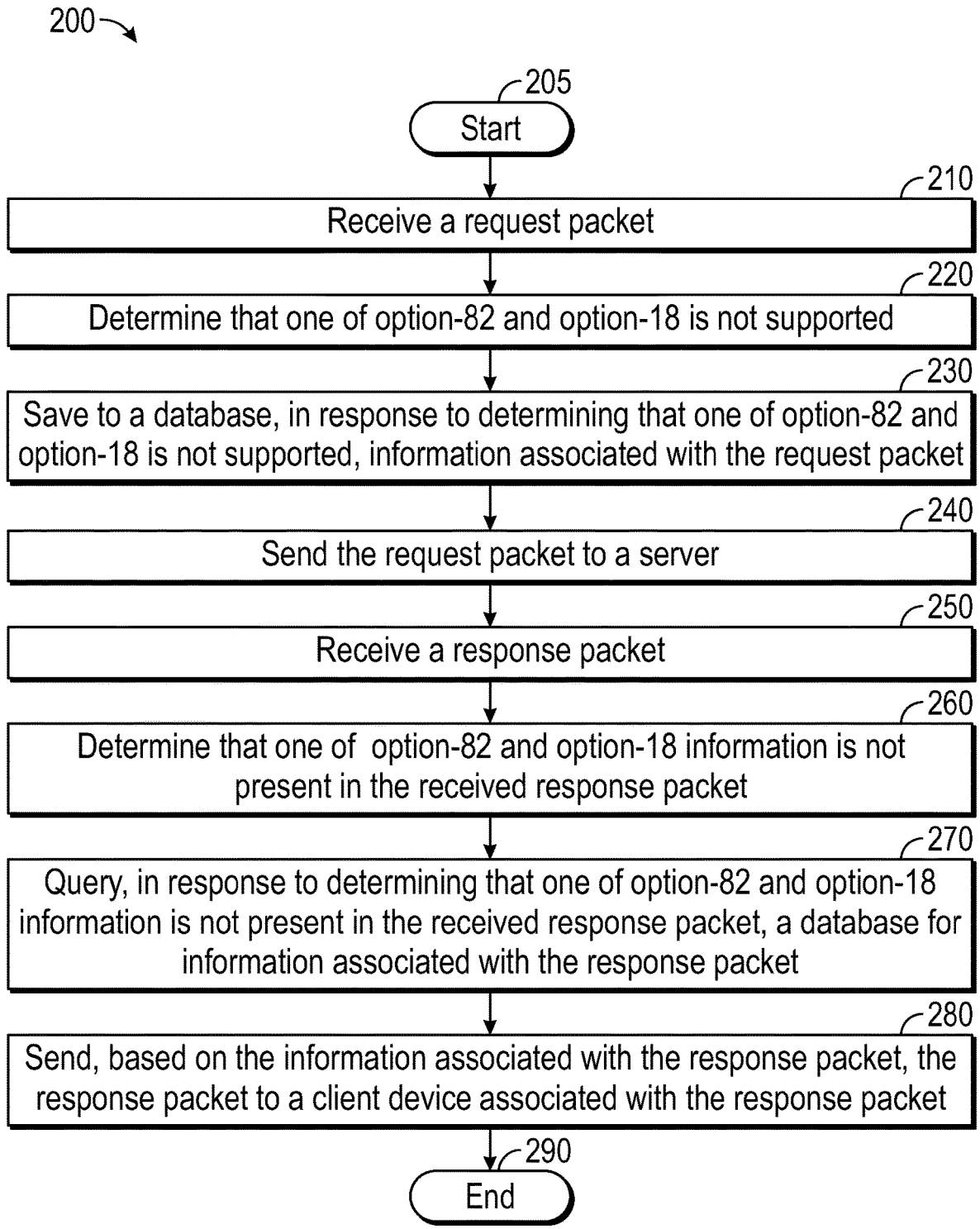
FIG. 2 is a flow chart of a method for providing relay functionality.

FIG. 2 is a flow chart setting forth the general stages involved in a method 200 consistent with embodiments of the disclosure for providing relay functionality. Method 200 may be implemented using a networking device, for example, first network device 120 or second network device 125 as described above with respect to FIG. 1. First network device 120 or second network device 125 may be practiced, for example, in a computing device 300 as described in more detail below with respect to FIG. 3. Ways to implement the stages of method 200 will be described in greater detail below.

Method 200 may begin at starting block 205 and proceed to stage 210 where a network device may receive a request packet. The network device may comprise, but is not limited to, first network device 120 or second network device 125. For example, first client device 135 may broadcast a DHCP request packet. When first client device 135 configures the DHCP server relay label for the DHCP request packet, first client device 135 may add additional information if server 115 does not support Option-82 or if server 115 does not support Option-18. The broadcast DHCP request packet from first client device 135 may go to a supervisor (i.e., SUP) on a first client device 135 connected ToR switch. First client device 135 connected ToR switch may append the associated Option-82 information with the broadcast DHCP request packet.

From stage 210, where the network device (e.g., second network device 125) receives the request packet, method 200 may advance to stage 220 where the network device may determine that one of Option-82 and Option-18 is not supported. For example, a relay attached to the Boarder Device (BD) (i.e., second network device 125) may determine that it has no Option-82 or Option-18 enabled.

Once the network device determines that one of Option-82 and Option-18 is not supported in stage 220, method 200 may continue to stage 230 where the network device may save to a database, in response to determining that one of Option-82 and Option-18 is not supported, information associated with the request packet. For example, if the relay attached to the BD (i.e., second network device 125) has no Option-82 or Option-18 enabled, the contents from Option-82 or Option-18 (e.g., including the circuit ID) may be copied to a local database on second network device 125. Also a bit may be added to the request packet to indicate "no Option-82" or "no Option-18". This database with key (e.g., first client device 135's Media Access Control (MAC) address and a transaction ID) may store this information. The request packet may be unicast to server 115.

After the network device saves to the database information associated with the request packet in stage 230, method 200 may proceed to stage 240 where the network device may send the request packet to server 115. Server 115 may comprise a DHCP server that may not support Option-82 or Option-18. For example, the request packet may be sent via unicast from second network device 125 to first network device 120. Because the request packet may have the "no Option-82" or the "no Option-18" bit set, the contents from Option-82 or Option-18 (e.g., including the circuit ID) may be copied to a local database on first network device 120. First network device 120 may strip the Option-82 or Option-18 content and resend the request packet to server 115 where it may be serviced. Server 115, which may not be support Option-82 or Option-18, may respond to the request packet by creating a DHCP response packet in response to the request packet.

From stage 240, where the network device sends the request packet to server 115, method 200 may advance to stage 250 where the network device may receive the response packet. For example, whenever any network device (e.g., first network device 120 or second network device 125) in system 100 receives the response packet the following stages may be performed.

Once the network device receives the response packet in stage 250, method 200 may continue to stage 260 where the network device may determine that one of Option-82 and Option-18 information is not present in the received response packet. After the network device determines that one of Option-82 and Option-18 information is not present in the received response packet in stage 260, method 200 may proceed to stage 270 where the network device may query, in response to determining that one of Option-82 and Option-18 information is not present in the received response packet, a database for information associated with the response packet. For example, if Option-82 or Option-18 is not present in the response packet, the local database may be queried to look up for this entry.

From stage 270, where the network device queries the database for information associated with the response packet, method 200 may advance to stage 280 where the network device may send, based on the information associated with the response packet, the response packet to a client device (e.g., first client device 135) associated with the response packet. For example, if the local database has this entry (e.g., MAC address, transaction ID) then the network device may send the response packet to the correct client device ToR switch (e.g. second network device 125). This may be done by sending the response packet in infra Virtual Routing and Forwarding (VRF) directly to the client device's ToR switch's Tunnel Endpoint (TEP) IP address with the DHCP response packet contents.

If the entry is not present in the local database, the response packet may be sent over all ToR Global IP Outside (GIPO) such that the response packet may be received by all ToRs in system 100. When the response packet received on all ToRs reaches the correct client device ToR, it may be processes further. Other ToRs that receive the response packet may drop it because no local entry may be found. The client ToR may get the circuit ID information (e.g., if_index, Virtual Local Area Network (VLAN) ID) from its local database and index direct the packet to the client device (i.e., first client device 135) that sent the request packet. The entry may be cleared from local database either on completion of the transaction or within a particular timer. Once the network device sends the response packet to the client device associated with the response packet in stage 280, method 200 may then end at stage 290.

Embodiments of the disclosure may ensure that DHCP relay works without Option-82 (or Option-18 for DHCPv6) and may also be compliant with the ACI security standards supported for DHCP relay. In other words, embodiments of the disclosure may support DHCP relay without Option-82 (or Option-18 for DHCPv6) in ACI fabric, where the pervasive BD may be stretched across multiple ToRs. This may keep the information locally on ToRs instead of sending it out in Option-82 (or Option-18 for DHCPv6). ACI may support all kinds of DHCP servers (i.e., with or without Option-82 or Option-18). This may work across multi-pod/multisite stretched fabric and may coexist in the same fabric if the fabric has heterogeneous DHCP servers (e.g., with or without DHCP Option-82 or Option-18).

Embodiments of the disclosure may provide a process for extending the DHCP relay functionality in a multi-POD and/or multi-site VXLAN/iVxLAN overlay fabric even with DHCP servers that do not support DHCP Option-82 or Option-18. The DHCP relay may temporarily add Option-82 or Option-18 to DHCP relay-request packets. The transit nodes (i.e., network devices) temporarily cache this information and use it to forward the return DHCP relay-response packet back to the right ToR. The last node connected to DHCP server, however, may remove the Option-82 or Option-18 data and may send the DHCP request packet to the server without Option-82 or Option-18. Embodiments of the disclosure may allow DHCP to work across Network Address Translation (NAT) boundaries in the underlay network even with DHCP servers that may not support DHCP Option-82 or Option-18.

Figure 3:
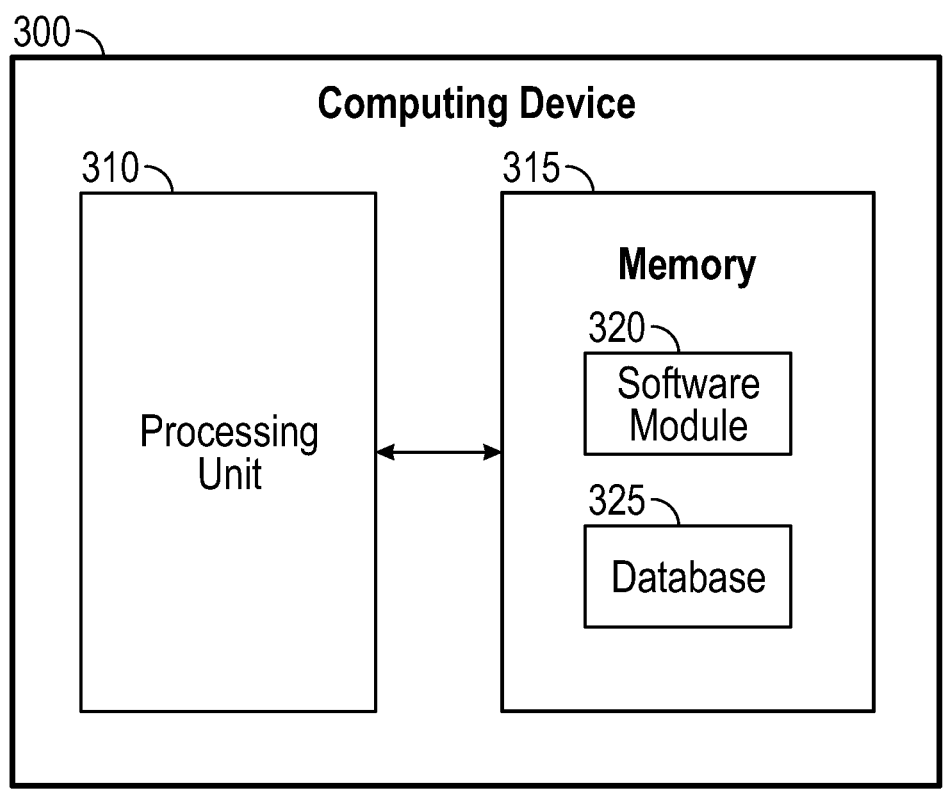
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for providing relay functionality as described above with respect to FIG. 2. Computing device 300, for example, may provide an operating environment for server 115, first network device 120, second network device 125, first client device 135, and second client device 140. Server 115, first network device 120, second network device 125, first client device 135, and second client device 140 may operate in other environments and are not limited to computing device 300.

Computing device 300 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving, by a network device, a request packet;
   determining that one of Option-82 and Option-18 is not supported;
   saving to a database, in response to determining that one of Option-82 and Option-18 is not supported, information associated with the request packet, wherein saving to the database the information associated with the request packet comprises:
      copying contents from the Option-82 or the Option-18 to a local database on the network device,
      storing the contents from the Option-82 or the Option-18 to the local database on the network device along with a key, and
      adding a bit into the request packet, the bit indicating that the request packet does not include the Option-82 or the Option-18; and
   sending the request packet to a server.

2. The method of claim 1, further comprising receiving, by the network device, a response packet.

3. The method of claim 2, further comprising determining that one of Option-82 information and Option-18 information is not present in the received response packet.

4. The method of claim 3, further comprising querying, in response to determining that one of the Option-82 information and the Option-18 information is not present in the received response packet, the database for information associated with the response packet.

5. The method of claim 4, further comprising sending, based on the information associated with the response packet, the response packet to a client device associated with the response packet.

6. The method of claim 1, wherein determining that one of the Option-82 and the Option-18 is not supported comprises one of:
   determining that the network device does not support one of the Option-82 and the Option-18; and
   determining that the request packet does not support one of the Option-82 and the Option-18.

7. A method comprising:
   receiving, by a network device, a response packet;
   determining that one of Option-82 information and Option-18 information is not present in the received response packet;
   querying, in response to determining that one of Option-82 information and Option-18 information is not present in the received response packet, a database for information associated with the response packet, wherein querying the database for the information associated with the response packet comprises:
      receiving a request packet,
      determine that one of Option-82 and Option-18 is not supported,
      copying contents from the Option-82 or the Option-18 to a local database on the network device,
      storing the contents from the Option-82 or the Option-18 to the local database on the network device along with a key, and
      querying the local database for the information associated with the response packet; and
   sending, based on the information associated with the response packet, the response packet to a client device associated with the response packet.

8. The method of claim 7, receiving the response packet by a plurality of network devices other than the network device.

9. The method of claim 7, wherein determining that one of the Option-82 and the Option-18 is not supported comprises one of:
   determining that the network device does not support one of the Option-82 and the Option-18; and
   determining that the request packet does not support one of the Option-82 and the Option-18.

10. The method of claim 7, further comprising sending the request packet to a server.

11. The method of claim 10, wherein the server comprises a Dynamic Host Configuration Protocol (DHCP) server.

12. The method of claim 7, wherein receiving the response packet comprises receiving the response packet from a Dynamic Host Configuration Protocol (DHCP) server.

13. A system comprising:
    a memory storage; and
    a processing unit disposed in a network device and coupled to the memory storage, wherein the processing unit is operative to:
       receive a response packet;
       determine that one of Option-82 information and Option-18 information is not present in the received response packet;
       query, in response to determining that one of Option-82 information and Option-18 information is not present in the received response packet, a database for information associated with the response packet, wherein the processing unit being operative to query the database comprises the processing unit being operative to:
          receive a request packet,
          determine that one of Option-82 and Option-18 is not supported,
          copy contents from the Option-82 or the Option-18 to a local database on the network device,
          store the contents from the Option-82 or the Option-18 to the local database on the network device along with a key, and
          query the local database for the information associated with the response packet; and
       send, based on the information associated with the response packet, the response packet to a client device associated with the response packet.

14. The system of claim 13, wherein the processing unit being operative to receive the response packet comprises the processing unit being operative to receive the response packet from a Dynamic Host Configuration Protocol (DHCP) server.

15. The system of claim 13, wherein the processing unit is further operative to:
    send the request packet to a server.

16. The system of claim 13, wherein the key comprises a media access control address of a client device associated with the request packet and a transaction ID.

17. The system of claim 13, wherein the processing unit being operative to determine that one of the Option-82 and the Option-18 is not supported comprises the processing unit being operative to determine one of:

determine that the network device does not support one of the Option-82 and the Option-18; and determine that the request packet does not support one of the Option-82 and the Option-18.

18. The system of claim 13, wherein the response packet is received by a plurality of network devices other than the network device.

19. The method of claim 7, wherein the key comprises a media access control address of a client device associated with the request packet and a transaction ID.

20. The method of claim 1, wherein the key comprises a media access control address of a client device associated with the request packet and a transaction ID.

* * * * *